April 25, 1961  R. R. McCLURE  2,981,596
PREPARATION OF ALKALINE EARTH METAL CARBONATES
Filed June 18, 1956
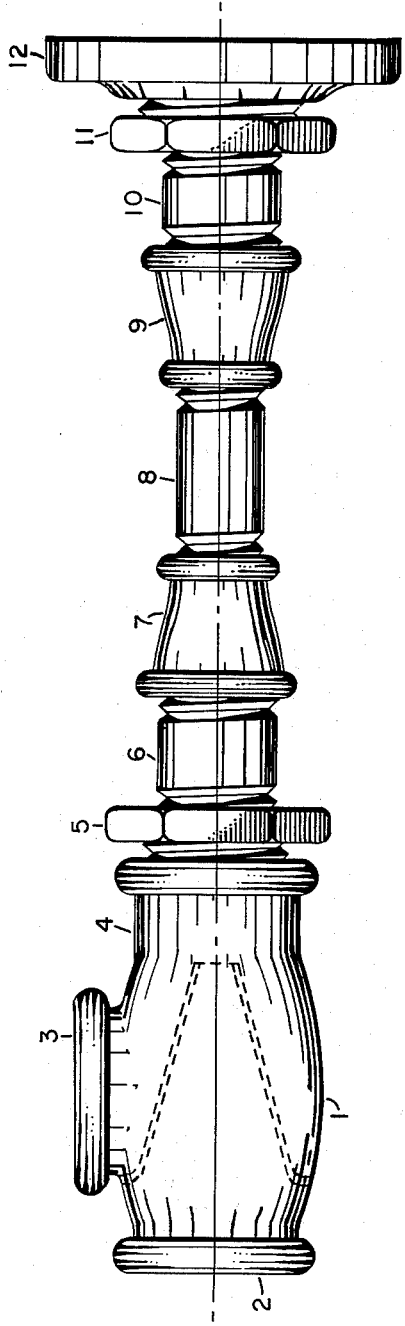
INVENTOR
RAYMOND R. McCLURE
BY Fred S. Valle
ATTORNEY United States Patent Office 2,981,596
Patented Apr. 25, 1961

2,981,596

PREPARATION OF ALKALINE EARTH METAL CARBONATES

Raymond R. McClure, Painesville, Ohio, assignor to Diamond Alkali Company, Cleveland, Ohio, a corporation of Delaware Filed June 18, 1956, Ser. No. 592,097

8 Claims. (Cl. 23—66)

This invention relates to a process for producing alkaline earth metal carbonates. More particularly, it relates to a process for producing finely divided alkaline earth metal carbonates of substantially uniform particle size by controlling the course of the reaction in a novel series of process steps to be described hereinbelow.

Finely divided alkaline earth metal carbonates, for example, calcium carbonate, are useful as fillers, pigments and coating materials. Finely divided calcium carbonate having a particle size of about 1 micron can be used as a pigment or filler in the rubber and paint industry. It is desirable to produce a product of as nearly a uniform particle size as possible to meet the requirements of the industrial consumer. The specification for uniformity of particle size, however, is difficult to meet and in numerous instances a range of particle size is the end product rather than a uniform size.

Generally, in prior methods for producing finely divided alkaline earth metal carbonates, a set of conditions and variables for the reaction is determined, and thereafter the reactants are mixed in a system, e.g., a mixing tank or vessel, in batch or continuous fashion, until the reaction is considered complete. The reaction products are then withdrawn from the system, if in the batch operation, and the procedure repeated. In continuous operation, the reactants and reaction products are continuously added and withdrawn from the reaction system or zone. In some of these operations, the precipitation of some of the freshly introduced materials is believed to take place in contact with "seeds," e.g., pre-existing precipitated alkaline earth metal carbonate particles, and it is believed that for this reason a range of particle sizes is produced, rather than a uniform product. Thus, in batch operation where, for example, large volumes of aqueous sodium carbonate and calcium chloride solutions are contacted in mixing vessels, there is an initial reaction and precipitation of fine particles, nuclei, or "seeds" of calcium carbonate upon contact of the two liquids while the major proportion of the reactants are still not in intimate contact due to the time required for complete mixing. This type of operation, although producing fine particle sizes, is prone to produce a range of calcium carbonate particle sizes that are not completely satisfactory. It is believed that non-uniformity in product size is caused by unreacted particles attaching to small nuclei or "seeds" of the initially precipitated material, thereby causing particle growth and subsequent production of a large amount of varying sizes of calcium carbonate product. This phenomena is also believed to hold true in continuous operations wherein only part of the reaction mixture is continuously withdrawn from a reaction zone making it possible for such completely reacted mixture to come in contact with the incompletely reacted components or freshly introduced reactants, whereby the completely reacted particles function as "seeds" or nuclei for the formation of larger undesirable particles.

In other instances, in the production of finely divided alkaline earth metal carbonates, after initial contact of the reactants in a reaction zone, the product is removed and led, for example, to tanks or vessels where the reaction is completed such as by agitating the mixture. This method of reaction also tends to produce an uneven distribution of particle sizes in the final product.

From what has been stated above, it should be noted that the mere dumping of one solution into another with agitation, or the flowing of the reactants together through a pipe for example, is believed to result in the production of a non-uniform particle size product.

It has now been discovered, in accordance with the process of this invention, that alkaline earth metal carbonates of improved and substantially uniform particle size can be produced by a series of steps to be defined below. Briefly stated, this invention consists of an improvement in the production of alkaline earth metal carbonates which comprises flowing a charge of reactant material through a constricted zone, then flowing said charge through an expanded zone, then rapidly flowing the reaction mixture through a confined zone until the reaction is substantially complete. By the process of this invention, controlled finely divided substantially uniform particles of an alkaline earth metal carbonate are produced.

In a preferred embodiment, the process of this invention involves contacting the reactants in a venturi zone, and then causing the mixture to expand, whereby it is violently and homogeneously mixed, and then flowing the mixture away from said zone so that the reacting particles are formed in the absence of pre-existing "seed" or precipitated calcium carbonate particles. Thus, when the two reactants combine to form a carbonate particle, the precipitated product is rapidly flowed away from contact with unreacted charge which would result in uneven particle growth. A complete, rapid, homogeneous mixing of the reactants and rapid flow is therefore essential in order to cause complete reaction of all the reacting particles in the absence of pre-existing "seed" particles in the entire reaction system of this invention. Once this complete mixing is accomplished, the particles are immediately removed to an additional zone, e.g., a pipe, where they are kept rapidly flowing away from any contact with new or unreacted charge and until the reaction is substantially complete. It is found that by the process steps defined above, substantially uniform and controlled particle sizes are produced by the process of this invention.

Although this invention is applicable to the production of alkaline earth metal carbonates generally, viz., barium, calcium, strontium, magnesium, and the like, the procedure for accomplishing controlled substantially uniform precipitation of desired particle size will be described with reference to calcium carbonate.

In this connection, several procedures for the production of calcium carbonate have been suggested. Thus, reactions involving calcium compounds with alkali metal carbonates such as sodium carbonate and ammonium carbonate or alkali metal hydroxide and carbon dioxide have heretofore been described. Reaction variables, such as temperatures, proportions of reactants, and the like, in order to produce calcium carbonate particles of a certain desired size have also been described. In addition, suggestions have been made in regard to the addition of protective or coating agents in order to prevent agglomeration of the precipitated particles. It should be understood that this invention is not limited by the type of reaction charge employed, reaction variables, or coating additives. It is within the scope of this invention, therefore, to employ the various conventional or prior art procedures relating to the production of alkaline earth metal carbonates since the invention resides in a series of process steps for producing controlled particle size carbonates of substantially uniform size as has been described above.

By the process of this invention a series of substantially uniform controlled particle size calcium carbonate precipitates can be produced. As a general example of the products of this invention, calcium carbonate can be produced in controlled substantially uniform particle sizes of from .03 micron or less and up to 25 microns or more. A narrower example is calcium carbonate of uniform particle size of from .03 to .15 micron, while a specific example is a uniform controlled calcium carbonate particle of .03 to .05 micron which is useful as a reinforcing agent in rubber and the like.

Generally, according to one embodiment of this invention a calcium carbonate of high purity is produced by contacting a soluble calcium salt and a soluble carbonate by employing stoichiometric quantities of each although an excess of one or the other can be used in order to insure complete elimination of the other. Thus, for example, calcium carbonate of high purity and particle size of from .03 to .05 micron is produced by contacting aqueous solutions of calcium chloride and sodium carbonate or ammonium carbonate at a temperature of from about 80 to 125° F. In the case where sodium carbonate is used, the reactants can be added in stoichiometric quantity, however, calcium chloride can be employed in excess amounts, for example, from 1 to 100% or higher, since no adverse effects will result even at 200 or 300% excess.

The concentration of the aqueous solution of calcium chloride and sodium carbonate can vary, however, for the purpose of producing calcium carbonate of particle size of .03 to .05 micron calcium chloride in concentrations of from 50 to 200 grams per liter is employed, while sodium carbonate is employed in concentrations ranging from 100 to 275 grams per liter.

It should be mentioned that in the process of this invention the waste products from an ammonia soda plant, e.g., calcium chloride, can be employed as reactants for the production of calcium carbonate of controlled particle size.

In order that this invention may be more fully understood by those concerned, reference is made to the attached drawing and the example given below.

In the drawing, 1 represents a suction valve with inlet openings 2 and 3. A suction T, 4, is attached by bushing 5 to nipple 6, which in turn is connected to reducer 7. A short length of pipe or nipple 8 of reduced diameter connects reducer 7 to reducer 9. It should be noted that reducer 9 is in reality an expansion zone since the reactants flow from reducing zone 9. A nipple 10 is joined to reducer 9 and flange 12 by a bushing 11. Attached to flange 12 (not shown) is a long length of pipe and coils which form a complete reactor system. Thus, in a reactor such as shown in the drawing, having dimensions of approximately 26 inches in length and of the order of 4 inches in width and 1¼ inches internal diameter for nipple 8, there is provided for a complete reactor system a suitable length of pipe, i.e., about 70 feet long, attached to flange 12. The pipe can be constructed of any suitable material, for example, polyethylene, and may be joined by several feet of coil to provide sufficient residence time for the completion of the reaction. The volume of such a reactor can be typically about 14 gallons.

In operation, desired proportions of aqueous solutions of calcium chloride and sodium carbonate are introduced respectively into inlets 2 and 3 and rapidly passed to zone 8 where the mixture is contracted and then expanded in zones 9 and 10. This contraction and expansion of the mixture produces a violent, complete and homogeneous mixture thereby causing complete contact of all the reactant particles. Since the reaction may not be completed in this short partial reaction zone, the reactants are rapidly conveyed to a long length of pipe to insure substantially complete precipitation of the material. The reaction mixture is thus kept in continuous agitated motion and moved away from contact with any following unreacted materials. The long length of pipe insures proper residence time so that by the time initially introduced reaction particles reach the end of the reaction zone they have reacted substantially completely and have been removed from contact with any following unreacted materials. The reaction product is washed, filtered and dried or used in a slurry if desired. It should be mentioned that any gelling problem upon contact or reaction of the materials is substantially eliminated due to the violent mixing and flowing of the material.

The following example illustrates an application of the process of this invention.

*Example*

In a commercial process for the production of calcium carbonate of a uniform particle size of from .03 to .05 micron there is introduced approximately 50 gallons per minute of two streams, one of about 38 gallons of calcium chloride of 120 grams per liter concentration and the remainder of sodium carbonate of 225 grams per liter concentration. At this introduction rate in the apparatus described, i.e., of a capacity of 14 gallons, the 50 gallons of reaction mixture takes about 17 seconds to flow through the reactor system. Although the reaction is complete at the end of the reaction zone, the precise time for complete reaction within the 17 seconds varies. The temperature at which the reactants are contacted is 100° F. The pH of the reactant mixture is properly adjusted as is well-known in the art. The reaction product is of uniform particle size in the range of .03 to .05 micron and is stable, that is, it does not increase in particle size on further processing, i.e., filtering and drying. The product produced has a weight percent of approximately 80 in the particle size range of .03 to .05 micron.

From the above example, it can be seen that by the process of this invention a highly desirable product of substantially uniform particle size is produced. The result is completely unexpected and the method of operation is novel.

Although the invention has been described with reference to calcium carbonate and with reference to particle sizes of the order of .03 to .05 micron, it should be understood that uniform particle sizes above this range and other alkaline earth metal carbonate products are within the scope and process of this invention.

Having thus described this invention, it is intended to cover the various aspects and modifications that fall within the spirit of the invention and the scope of the appended claims.

What is claimed is:

1. In a process for producing alkaline earth metal carbonates of substantially uniform finely divided particle size wherein a soluble alkaline earth metal salt and a soluble carbonate are contacted in a reaction zone to produce precipitation of alkaline earth metal carbonates, the improvement which comprises introducing the reactants initially into a constricted zone, then introducing the thus-formed reaction mixture into an expanded zone, then rapidly flowing said reaction mixture from said expanded zone and through a confined zone wherein the reaction takes place in substantially complete absence of pre-existing alkaline earth metal carbonate particles.

2. In a process for producing alkaline earth metal carbonates of substantially uniform finely divided particle size wherein a soluble alkaline earth metal salt and a soluble carbonate are mixed in a reaction zone to produce precipitation of alkaline earth metal carbonates, the improvement which comprises introducing the reactant mixture into a venturi zone, then introducing the thus-formed reaction mixture into an expanded zone to cause a quick substantially complete homogeneous mixing and thereafter rapidly removing said reaction mixture to an elongated confined zone wherein precipitation is accomplished in substantially complete absence of pre-existing alkaline earth metal carbonates.

3. An improved process for producing substantially uniform fine particle size calcium carbonate which comprises the steps of contacting a reaction mixture of a soluble calcium salt and a soluble carbonate in a constricted zone, and then an expanded zone, followed by rapidly flowing the mixture into an elongated confined zone wherein the reacting materials, from initial contact to substantially complete precipitation, react in substantially complete absence of pre-existing calcium carbonate particles.

4. An improved process for producing substantially uniform calcium carbonate particles of a particle size of from .03 to 25 microns which comprises contacting aqueous solutions of calcium chloride and sodium carbonate in a venturi zone, and then an expanded zone to cause a quick substantially complete homogeneous mixing, and thereafter rapidly removing said reactants from said zone by flowing them through an elongated confined zone, wherein the reacting materials, from initial contact to substantially complete precipitation, react in substantially complete absence of pre-existing calcium carbonate particles.

5. An improved process according to claim 4 wherein a calcium carbonate of particle size of from .03 to .15 micron is produced.

6. An improved process according to claim 5 wherein a calcium carbonate of particle size of from .03 to .05 micron is produced.

7. An improved process for producing substantially uniform calcium carbonate particles of a particle size of from .03 to 25 microns which comprises contacting aqueous solutions of calcium chloride and sodium carbonate at a temperature range of from about 80 to 125° F. in a venturi zone and then an expanded zone to cause a quick substantially complete homogeneous mixing, rapidly passing said mixture to an elongated confined reaction zone and flowing said mixture in said elongated zone until a substantially complete precipitation is accomplished, said precipitation being accomplished from the initial contact of the solutions and in substantially complete absence of pre-existing calcium carbonate particles.

8. An improved process for producing substantially uniform calcium carbonate particles of a particle size of from .03 to 25 microns which comprises contacting aqueous solutions of calcium chloride and ammonium carbonate in a venturi zone, and then an expanded zone to cause a quick substantially complete homogeneous mixing, and thereafter rapidly removing said reactants from said zone by flowing them through an elongated confined zone, wherein the reacting materials, from initial contact to substantially complete precipitation, react in substantially complete absence of pre-existing calcium carbonate particles.

References Cited in the file of this patent

UNITED STATES PATENTS

| Number | Name | Date |
| --- | --- | --- |
| 945,143 | Szamek | Jan. 4, 1910 |
| 2,164,943 | Roderick | July 4, 1939 |
| 2,182,096 | Roderick | Dec. 5, 1939 |
| 2,563,002 | Bizzell et al. | Aug. 7, 1951 |
| 2,587,999 | Heller et al. | Mar. 4, 1952 |
| 2,866,681 | Pan | Dec. 30, 1958 |